United States Patent
Cerrato

(10) Patent No.: US 7,496,553 B2
(45) Date of Patent: Feb. 24, 2009

(54) METHOD AND APPARATUS FOR IDENTIFYING UNIQUE CLIENT USERS FROM USER BEHAVIORAL DATA

(75) Inventor: Dean E. Cerrato, Boston, MA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 147 days.

(21) Appl. No.: 11/504,366

(22) Filed: Aug. 14, 2006

(65) Prior Publication Data

US 2007/0094208 A1    Apr. 26, 2007

(51) Int. Cl.
*G06F 17/00* (2006.01)
*G06N 5/02* (2006.01)

(52) U.S. Cl. .............................. 706/48; 706/46; 706/12; 706/14

(58) Field of Classification Search .................. 706/48, 706/14, 12, 46; 737/350
See application file for complete search history.

(56) References Cited

U.S. PATENT DOCUMENTS

| | | | |
|---|---|---|---|
| 6,427,063 B1 * | 7/2002 | Cook et al. .................. | 434/350 |
| 6,757,691 B1 * | 6/2004 | Welsh et al. ............. | 707/104.1 |
| 6,882,977 B1 * | 4/2005 | Miller ......................... | 705/10 |
| 6,882,990 B1 * | 4/2005 | Barnhill et al. ............... | 706/16 |
| 6,889,218 B1 * | 5/2005 | Nassehi ....................... | 706/45 |
| 7,020,643 B2 * | 3/2006 | Mah et al. .................... | 706/46 |
| 7,092,926 B2 * | 8/2006 | Cerrato ........................ | 706/48 |

\* cited by examiner

*Primary Examiner*—Joseph P Hirl
(74) *Attorney, Agent, or Firm*—Patterson & Sheridan, LLP

(57) ABSTRACT

A method and system are provided for identifying a current user of a terminal device from a group of possible users. The method includes providing a database containing multiple user input pattern profiles of prior user inputs to the terminal device. Each of the possible users of the group are associated with at least one of the user input pattern profiles. Current input patterns from use of the terminal device are detected. The current input patterns are combined and then dynamically matched with one of the user input pattern profiles, and the possible user associated with the matched user input pattern profile is selected as the current user. The system for identifying a current user of a terminal device from a group of possible users includes a database containing multiple user input pattern profiles of prior user inputs to the terminal device. Each of the possible users is associated with at least one of the user input pattern profiles. The system detects current input patterns from use of the terminal device, and then combines the patterns and dynamically matches the patterns with one of the user input pattern profiles. The system selects the possible user associated with the matched user input pattern profiles as the current user.

25 Claims, 3 Drawing Sheets

METHOD AND APPARATUS FOR IDENTIFYING UNIQUE CLIENT USERS FROM USER BEHAVIORAL DATA

RELATED APPLICATIONS

The present application is a continuation of pending U.S. patent application Ser. No. 10/117,654 which application is based on and claims priority from U.S. Provisional Patent Application Ser. No. 60/282,028 filed on Apr. 6, 2001 and entitled "Method and Apparatus for Identifying Unique Client Users from Clickstream, Keystroke and/or Mouse Behavioral Data."

BACKGROUND OF THE INVENTION

1. Field of the Invention

The present invention relates generally to monitoring the activity of users of client terminal devices and, more particularly, to a method and system for identifying unique users from user behavioral data.

2. Description of Related Art

Various systems are available for profiling users of client terminal devices. Profiling typically involves determining demographic and interest information on users such as, e.g., age, gender, income, marital status, location, and interests. User profiles are commonly used in selecting targeted advertising and other content to be delivered to particular users. Delivery of targeted content is advantageous. For example, targeted advertising has been found to be generally more effective in achieving user response (such as in click-through rates) than advertising that is generally distributed to all users.

Client terminal devices are commonly used by multiple individual users. For example, a home computer or a household television set can typically be expected to be used by various different family members at different times. Each particular user is likely to have a very different profile from other possible users, making delivery of targeted content ineffective. A need accordingly exists for distinguishing between various possible users at a given client terminal device.

BRIEF SUMMARY OF VARIOUS EMBODIMENTS OF THE INVENTION

Certain embodiments of the present invention are directed to a method and system for identifying a current user of a terminal device from a group of possible users. The method in accordance with one embodiment includes providing a database containing multiple user input pattern profiles of prior user inputs to the terminal device. Each of the possible users of the group is associated with at least one of the user input pattern profiles. Current input patterns from use of the terminal device are detected. The current input patterns are combined and then dynamically matched with one of the user input pattern profiles, and the possible user associated with the matched user input pattern profile is selected as the current user.

The system for identifying a current user of a terminal device from a group of possible users in accordance with another embodiment includes a database containing multiple user input pattern profiles of prior user inputs to the terminal device. Each of the possible users is associated with at least one of the user input pattern profiles. The system detects current input patterns from use of the terminal device, and then combines the patterns and dynamically matches the patterns with one of the user input pattern profiles. The system selects the possible user associated with the matched user input pattern profiles as the current user.

These and other features of embodiments of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWING

For a fuller understanding of the nature and objects of various embodiments the present invention, reference should be made to the following detailed description taken in connection with the accompanying drawings wherein.

DETAILED DESCRIPTION OF PREFERRED EMBODIMENTS

The present invention is generally directed to a method and system for identifying a current user from a group of possible users of a client terminal device from user behavioral data. Once the user is identified, targeted content (such as, e.g., targeted advertising or recommended programming) can be delivered to the terminal device.

Figure 1:
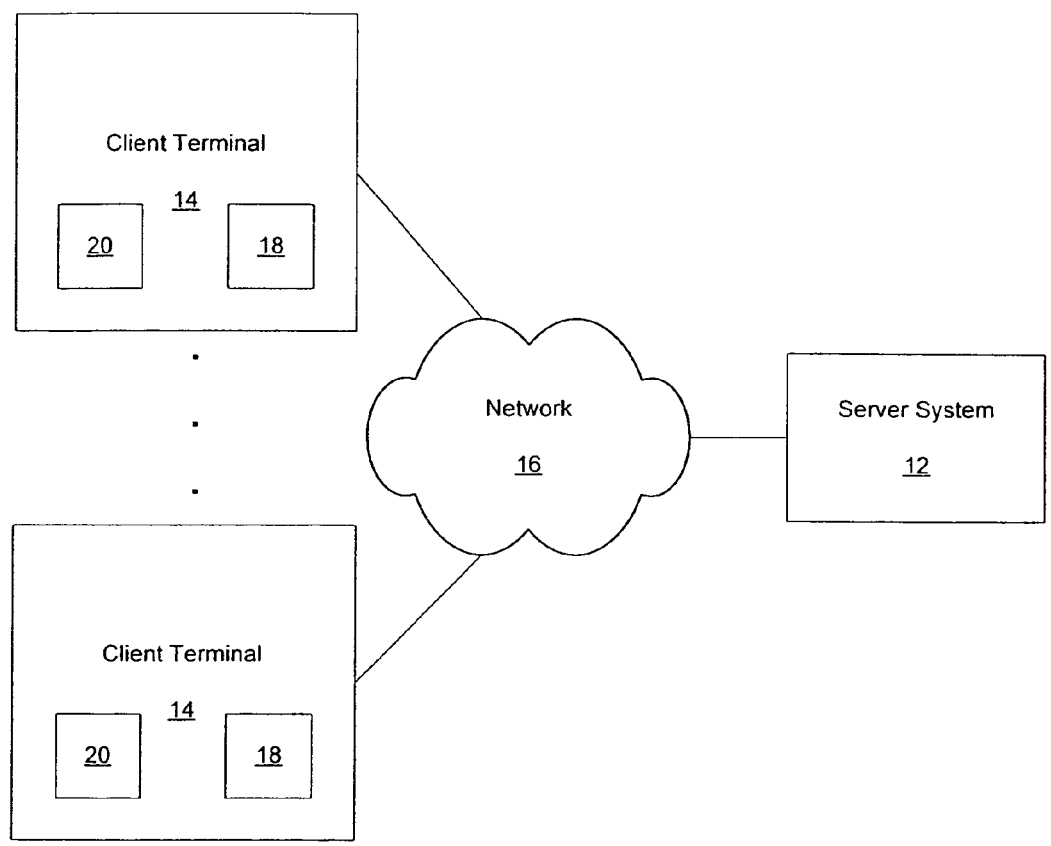
FIG. 1 is a schematic diagram illustrating of a representative network in which a system in accordance with various embodiments of the inventions can be implemented.

FIG. 1 schematically illustrates a representative network in which a system for identifying unique users can be implemented. In general, the system 10 includes a server system 12 for delivering content to a plurality of user terminals or client devices 14 over a network 16. Each user terminal 14 has an associated display device 18 for displaying the delivered content. Each terminal 14 also has a user input or interface interaction device 20 that enables the user to interact with a user interface on the terminal device 14. Input devices 20 can include, but are not limited to infrared remote controls, keyboards, and mice or other pointer devices.

In some embodiments, the network 16 can comprise a television broadcast network (such as, e.g., digital cable television, direct broadcast satellite, and terrestrial transmission networks), and the client terminal devices 14 can comprise, e.g., consumer television set-top boxes. The display device 18 can be, e.g., a television monitor.

In some embodiments, the network 16 can comprise a computer network such as, e.g., the Internet (particularly the World Wide Web), Intranets, or other networks. The server system 12 can comprise, e.g., a Web server, the terminal device can 14 comprise, e.g., a personal computer (or other Web client device), and the display device 18 can be, e.g., a computer monitor.

Television System Embodiments

In the television system embodiments, the server system 12 can comprise, e.g., a video server, which sends data to and receives data from a terminal device 14 such as a television set-top box such as a digital set-top box.

The network 16 can comprise an interactive television network that provides two-way communications between the server 12 and various terminal devices 14 with individual addressability of the terminal devices 14.

The network 16 can, e.g., comprise a television distribution system such as a cable television network comprising, e.g., a nodal television distribution network of branched fiber-optic and/or coaxial cable lines. Other types of networked distribution systems are also possible including, e.g., direct broadcast satellite systems, off-air terrestrial wireless systems and others.

The terminal device 14 (e.g., set-top box) can be operated by a user with a user interface interaction device 20, e.g., a remote control device such as an infrared remote control having a keypad.

Internet Embodiments

In the Internet (or other computer network) embodiments, the client terminals 14 connect to multiple servers 12 via the network 16, which is preferably the Internet, but can be an Intranet or other known connections. In the case of the Internet, the servers 12 are Web servers that are selectively accessible by the client devices. The Web servers 12 operate so-called "Web sites" and support files in the form of documents and pages. A network path to a Web site generated by the server is identified by a Uniform Resource Locator (URL).

One example of a client terminal device 14 is a personal computer such as, e.g., a Pentium-based desktop or notebook computer running a Windows operating system. A representative computer includes a computer processing unit, memory, a keyboard, a pointing device such as a mouse, and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired. The content delivered by the system to users is displayed on the screen.

Client terminals 14 typically include browsers, which are known software tools used to access the servers 12 of the network. Representative browsers for personal computers include, among others, Netscape Navigator and Microsoft Internet Explorer. Client terminals 14 usually access the servers 12 through some Internet service provider (ISP) such as, e.g., America Online. Typically, multiple ISP "point-of-presence" (POP) systems are provided in the network, each of which includes an ISP POP server linked to a group of client devices 14 for providing access to the Internet. Each POP server is connected to a section of the ISP POP local area network (LAN) that contains the user-to-Internet traffic. The ISP POP server can capture URL page requests and other data from individual client devices 14 for use in identifying unique users as will be described below, and also to distribute targeted content to users.

As is well known, the World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a device machine having an HTML-compatible browser (e.g., Netscape Navigator) can retrieve a Web page (namely, an HTML formatted document) of a Web site by specifying a link via the URL (e.g., www.yahoo.com/photography). Upon such specification, the client device makes a transmission control protocol/Internet protocol (TCP/IP) request to the server identified in the link and receives the Web page in return.

U.S. patent application Ser. No. 09/558,755 filed Apr. 21, 2000 and entitled "Method And System For Web User Profiling And Selective Content Delivery" is expressly incorporated by reference herein. That application discloses a method and system for profiling online users based on their observed surfing habits and for selectively delivering content, e.g., advertising, to the users based on their individual profiles.

User Identification from Behavioral Data

Various embodiments of the invention are directed to identifying a current individual user of a client device from a group of possible users. Such identification can be made from user behavioral data, particularly from input patterns detected in use of input devices (such as keyboards, mice, and remote control devices). As will be described in further detail below, the detected input patterns from a current user are compared with a set of input pattern profiles, which can be developed over time and stored in a database for the group of possible users. The current user is identified by substantially matching the current input pattern with one of the stored pattern profiles, each of which is associated with one of the possible users.

The database of input pattern profiles and software for detecting and matching current input patterns can reside at the client terminal 14 or elsewhere in the network such as at the server 12 or at the ISP POP server, or distributed at some combination of locations.

Different types of input data patterns can be used separately or in combination for identifying current users. The various types of input data patterns can include, e.g., (1) clickstream data; (2) keystroke data; (3) mouse usage data; and (4) remote control device usage data.

Briefly, in an Internet implementation, clickstream data generally relates to the particular websites accessed by the user. This information can include the URLs visited and the duration of each visit. In a television implementation, clickstream data generally relates to television surf stream data, which includes data on the particular television channels or programs selected by a user. Keystroke data relates to keyboard usage behavior by a user. Mouse data relates to mouse (or other pointer device) usage behavior by a user. Remote control device data relates to usage behavior of a remote control device, particularly to operate a television set. For each of these types of user data, a sub-algorithm can be provided for detecting and tracking recurring patterns of user behavior.

User identification can be performed using any one of these types of user behavioral data or by combining two or more types of data. A so-called 'fusion' algorithm is accordingly provided for combining the outputs from two or more of the sub-algorithms to detect unique users. Briefly, the fusion algorithm keeps track of which combinations of particular patterns from, e.g., three types of data (e.g., {click pattern "A," key stroke pattern "C," mouse pattern "F"}) recur most consistently, and associates these highly recurrent combinations with particular users.

Clickstream Behavior Tracking

Different Web or television users have different Web/television channel surfing styles and interests. The clickstream sub-algorithm described below extracts distinguishing features from raw clickstreams generated by users during Web/online surfing or television viewing sessions. In general, recurrent patterns of behavior in various observed different clickstreams are detected and stored. Incoming clickstreams from a user client device are compared with these stored patterns, and the set of patterns most similar to the incoming clickstream pattern is output, along with their corresponding similarity scores.

Clickstream Statistics

During an online session, the clickstream generated by the current user can be distilled into a set of statistics so that different clickstreams can be easily compared and their degree of similarity measured. This degree of similarity can be the basis for associating different clickstreams as possibly having been generated by the same person.

The following are sets of example clickstream statistics:

1) Total Duration of Visits to Top-N URLs or of Viewing of Top-N Television programs or channels One set of clickstream statistics can be the top N (N can be variable, but is usually 8-10) unique URLs or channels/programs that appear in the current clickstream, selected according to total duration of visits at these URLs or of viewing of the channels/programs. The total duration is computed and stored. In addition to the Top-N unique URLs or channels/programs, a catch-all category named 'Other' can also be maintained.

2) Transition Frequencies among Top-N URLs or Channels/Programs

Another set of clickstream statistics can be a matrix mapping 'From' URLs to 'To' URLs or 'From' channels/programs to 'To' channels/programs that captures the total number of all transitions from one URL or channel/program to the next in the clickstream. Transitions can be tracked among the Top-N URLs or channels/programs as well as those in the 'Other category.' In addition, 'Start' and 'End' URLs or channels/program can be used along with the 'from ' and 'to' dimensions, respectively.

These statistics can be used to form a pattern of user surfing behavior. They can capture both the content of the clickstream (as represented by the content of the Top-N URLs or channels/programs), as well as some of the idiosyncratic surfing behavior of the user (as manifested, e.g., in transition behavior and proportion of sites or channels/programs that are 'Other').

User profiling can take into account the possibility that user input patterns are dependent on time. For example, in a television implementation, user viewing behavior can vary, e.g., based on the time of day or the given hour of a week.

Similarity Metrics

The similarity of clickstreams can be measured by calculating the similarity of statistics such as those described above between two different clickstreams. There are several different possible similarity metrics that can be used in distinguishing or comparing different clickstreams. Examples of such metrics include the following:

1) Dot-Product of 'Duration' Unit Vectors Two 'duration' vectors are considered to be similar if they point in the same direction in URL or channels/programs -space, i.e., each clickstream visits many of the same Top-N URLs or channels/programs in similar proportions, regardless of the actual length or duration of the clickstream. This similarity is measured by computing the dot-product between the 'duration' unit vectors. Perfect similarity returns a value of unity, no similarity returns zero. The similarity of 'Other' values is preferably not included in this calculation since two clickstreams with identical 'Other' values might have in fact no similarity at all.

2) Dot-Product of Unit-Vectorized 'Transition' Matrices

For similar reasons, the transition matrices can be compared using a dot-product metric. The matrices must first be vectorized (i.e., the elements are placed in a vector). Transitions to and from 'Other' are considered generally significant and can be included in the calculation.

3) Similarity of 'Other' Duration

The proportion of time spent at 'Other' URLs or channels/programs relative to the total user session time can be compared. Similarity is measured by computing for each of the two clickstreams to be compared the proportion of time spent at 'Other' URLs or channels/programs, then dividing the smaller of the two by the larger.

4) Similarity of Total Duration

This is a measure of similarity in the total duration of the clickstreams.

5) Similarity of Total Number of Distinct URLs or Channels/Programs

This is a measure of the similarity in the total number of distinct URLs or channels/programs appearing in these clickstreams.

Each of these similarity metrics can be computed separately. If multiple metrics are used, they can be combined using various techniques. For example, a composite similarity metric can be computed by multiplying a select subset of these metrics together. Trial and error on actual data can determine which subset is most suitable. However, the similarity between duration vectors and transition matrices are likely to be more useful.

A good similarity metric will result in a good separation between users who have reasonably different surfing habits, and will not overly separate clickstreams generated by the same individual when that person is manifesting reasonably consistent surfing behavior.

Matching Clickstreams Based on Similarity

Clickstreams that have high similarity values can be considered possibly to have been generated by the same person. There are many possible ways to compute similarity. For example, one way to match a clickstream to one of a set of candidates is to select the candidate that has the highest similarity value. This technique is called a 'hard match'.

Alternatively, a somewhat more conservative approach can be to select a small group of very similar candidates rather than a single match. This group of candidates can subsequently be narrowed using some other criteria. This technique can be called finding a 'soft match'. A similarity threshold can be specified for soft matching. Soft matching is preferable when it is desired to match users according to multiple input pattern types such as keystroke and mouse dynamics in addition to clickstream behavior.

The Tracking Algorithm

Figure 2:
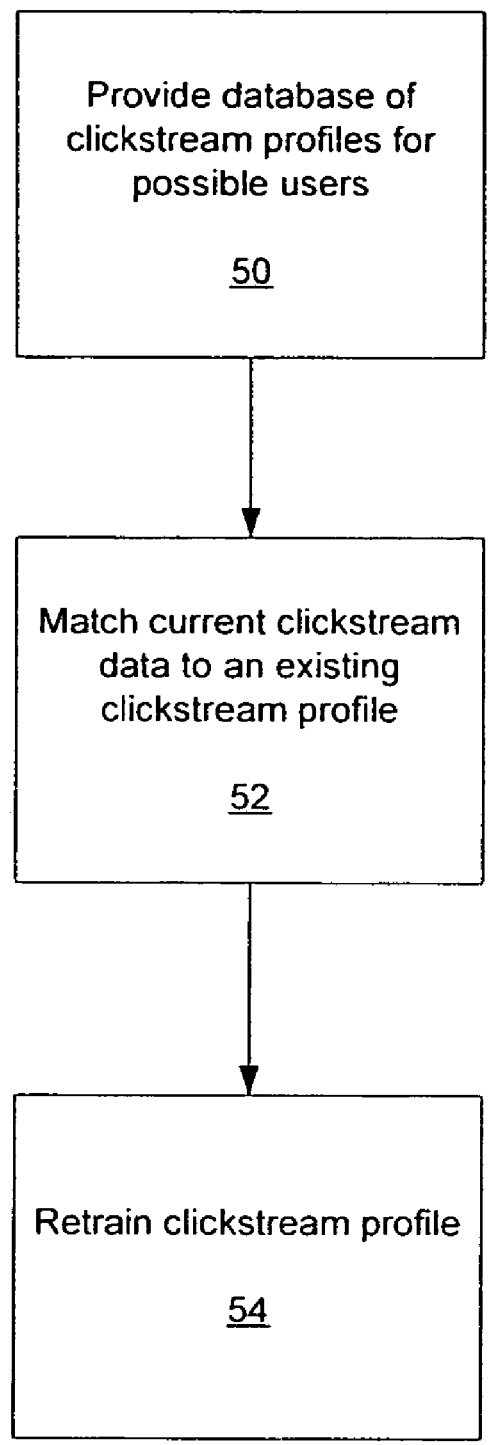
FIG. 2 is a flowchart generally illustrating the algorithm for matching a current clickstream with a stored clickstream profile in accordance with one embodiment.

It is desired to match incoming clickstreams with stored clickstream profiles representing recurrent clickstream patterns that have been observed over time. Each user is preferably associated with a single clickstream pattern profile. However, because an individual may have multifaceted interests, he or she may alternatively be associated with multiple clickstream pattern profiles. The process of matching incoming clickstreams with existing pattern profiles can be as follows as generally illustrated in FIG. 2.

1) First at step 50, a set of recurrent clickstream profiles is created and stored in a database. It is expected that for a single client terminal there will be multiple different observed clickstreams generated by usually a small set of individual users, each of whom may have several different strong areas of interest that manifest in their surfing behavior. These can be represented as a set of clickstream pattern profiles that summarize the content and surfing behavior of most or all the observed clickstreams.

A clustering algorithm, e.g., can be used to generate a small set of clickstream pattern profiles to cover the space of observed clickstreams. New clickstream profiles can be added whenever a new (i.e., dissimilar to existing profiles) clickstream is observed. Old profiles can be deleted if no similar incoming clickstreams have been observed for a given period of time. The growth/pruning behavior of the algorithm can be moderated by a similarity threshold value that determines how precisely the profiles are desired to match incoming clickstreams, and thus how many profiles will tend to be generated.

2) The next step 52 in the matching process is to dynamically (i.e., on-the-fly) match an incoming (i.e., current) clickstream to existing clickstream profiles. As a clickstream is being generated by a user, the partial clickstream can be compared on-the-fly at generally any time with the existing set of stored clickstream profiles. A hard or soft match can be made in order to determine the identity of the current user.

3) Next at step 54, the stored clickstream profiles are preferably retrained with data from completed clickstream. Upon termination of the current clickstream, the set of clickstream profiles is preferably retrained to reflect the latest clickstream observation. Clickstream profiles can be adjusted according to their similarity to the current clickstream.

Keystroke Behavior Tracking

Another type of distinguishing user input pattern relates to the typing styles or keystroke dynamics of different users. Different users have different typing styles. A keystroke dynamics algorithm is accordingly provided to capture these different styles so that they may be associated with unique users.

The keystroke algorithm can be similar to the clickstream algorithm described above. The process can generally include the following steps:

1) Statistics on current keyboard activity occurring concurrently with the current clickstream are compiled.

2) A set of keystroke profiles based on past observations of keyboard activity for a given terminal device are created and stored in a database.

3) The current keyboard activity is compared to the set of keystroke profiles to predict the user identity.

4) The keystroke profiles are preferably updated with the current keyboard activity once it has terminated.

Keystroke statistics can comprise a vector of average behavior that can be tested for similarity to other such vectors. The keystroke profiles for users can be created and trained in a similar manner as clickstream profiles. In addition, on-the-fly matching (hard or soft) of keystroke profiles to current keyboard input can be done in a similar manner as for clickstream matching.

One type of keystroke statistic that is particularly efficient and useful for characterizing typing behavior is the "digraph" interval. This is the amount of time it takes a user to type a specific sequence of two keys. By tracking the average digraph interval for a small set of select digraphs, a profile of typing behavior can be constructed.

The following is a list of frequent digraphs used in the English language (with the numbers representing typical frequency of the digraphs per 200 letters):

| TH | 50 | AT | 25 | ST | 20 |
| ER | 40 | EN | 25 | IO | 18 |
| ON | 39 | ES | 25 | LE | 18 |
| AN | 38 | OF | 25 | IS | 17 |
| RE | 36 | OR | 25 | OU | 17 |
| HE | 33 | NT | 24 | AR | 16 |
| IN | 31 | EA | 22 | AS | 16 |
| ED | 30 | TI | 22 | DE | 16 |
| ND | 30 | TO | 22 | RT | 16 |
| HA | 26 | IT | 20 | VE | 16 |

Several of the most frequent digraphs can be selected for use in each keystroke profile. It is preferable that the digraphs be selected such that substantially the entire keyboard is covered.

Mouse Dynamics Tracking

There is generally an abundance of mouse (or other pointing device) activity during a typical web browsing session, making it useful to characterize user behavior according to mouse dynamics alone or in combination with other user input behavior.

Similar to keystrokes, the statistics collected for mouse dynamics can form a vector that can be compared for similarity to other such vectors and can be input to an algorithm such as a clustering algorithm to identify recurring patterns.

Mouse behavior can include pointer motion and clicking action. The following are some examples of possible mouse usage statistics that can be gathered.

For clicking action, the average double-click interval can be determined. This can be the average time it takes a user to complete a double-click, which can be as personal as a keystroke digraph interval.

Also, for user clicking action, the ratio of double- to single-clicks can be determined. Much web navigation requires only single-clicks, yet many web users have the habit of double-clicking very frequently, which can be a distinguishing factor.

For user pointer motion behavior, the average mouse velocity and average mouse acceleration statistics can be distinctive characteristics of users. Motion is preferably gauged as close to the hand of the person as possible since mouse ball motion is generally a more useful statistic than pixel motion.

Furthermore, the ratio of mouse to keystroke activity can also be a useful distinguishing characteristic of users. Some people prefer to navigate with the mouse, while others prefer use of a keyboard.

The algorithm for matching current mouse dynamics statistics with stored mouse usage profiles can be similar to that described above with respect to the clickstream algorithm.

Other Input Device Usage Tracking

Various other user input behavior can be used for determining unique users. For example, in the television embodiments, user input patterns can be determined from usage of devices such as infrared remote control devices. The following are examples of various usage characterizing patterns for such devices. These include (1) the length of time a button on the remote control device is depressed to activate the button control; (2) the particular channels selected for viewing; (3) the digraphs for selecting multi-digit channels; (4) the frequency of use of particular control buttons such as the mute button; and (5) the frequency with which adjustments such as volume adjustments are made.

The algorithms for matching statistics such as these to stored input profiles can be similar to those previously described.

The Fusion Algorithm

Multiple independent sources of user information (clickstream, keystroke, mouse and any other input data) can be available, each having a corresponding algorithm that tracks recurring patterns in the input data. The existence of a set of unique users can be inferred from significant associations among these recurring input patterns. For example, a certain individual will tend to generate a particular keystroke pattern, a particular mouse pattern, and one or possibly several clickstream patterns. By detecting that these patterns tend to occur together and making an association, the existence of a unique user can be inferred.

Figure 3:
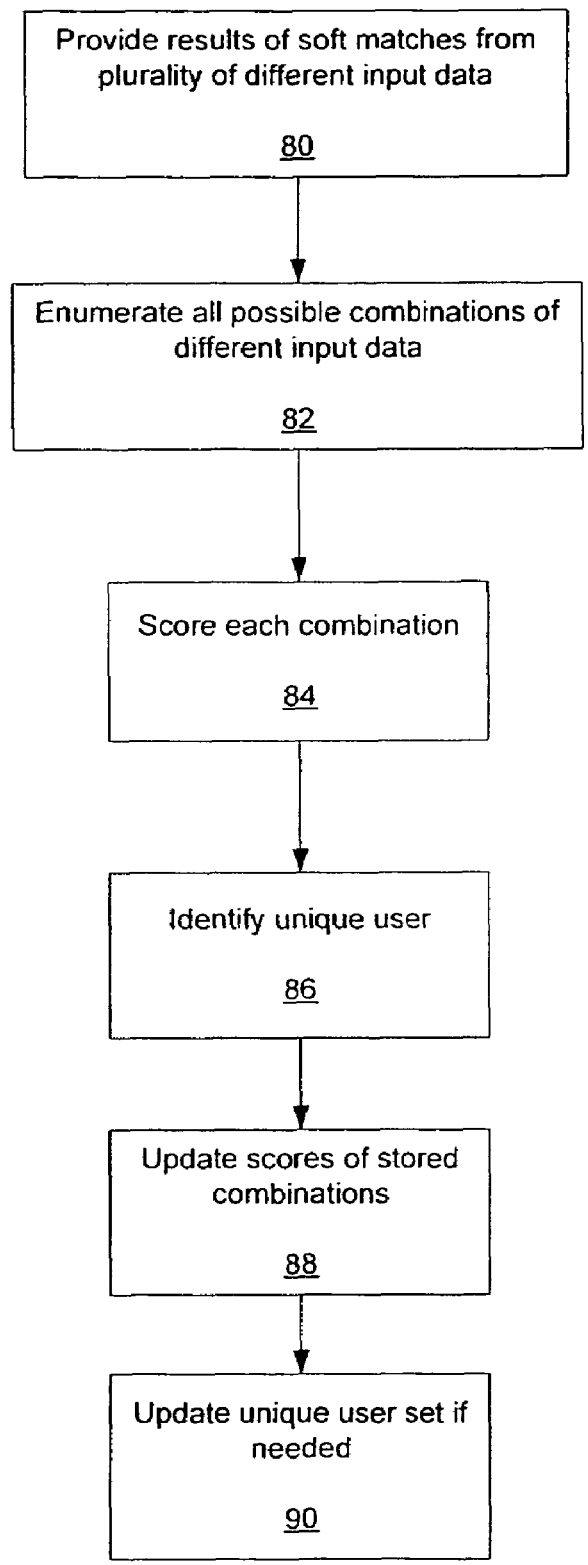
FIG. 3 is a flowchart generally illustrating the fusion algorithm for identifying a unique user from multiple sources of input data in accordance with another embodiment of the invention.

A 'fusion' algorithm, which is generally illustrated in FIG. 3, is provided to track associations among recurring patterns, to determine which patterns are significant, and to assign unique user status to those that are most significant. In addition, the fusion algorithm manages the addition and deletion of unique users from the system.

As previously described, each individual algorithm (e.g., for clickstream, keystroke, and mouse usage data) can perform a soft match between the current input data and its set of tracked patterns, and returns a list of most similar patterns along with their respective similarity scores as indicated in step 80. For example, the clickstream algorithm might return the following set of matched pattern data for clickstream data: {(pattern "2,"0.9), (pattern "4,"7), (pattern "1,"0.65) }, where the first entry of each matched pattern data indicates the particular matched pattern, and the second entry indicates the similarity score for that match.

The fusion algorithm tracks the frequency of recurrence of each possible combination of patterns among multiple individual algorithms. For example, a possible combination can have the form: {click pattern "c," key pat tern "k," mouse pattern "m" }. If there are a total of C click patterns, K keystroke patterns, and M mouse patterns being tracked, then the total number of tracked combinations is C*K*M, which can be on the order of a few hundred, assuming the number of keystroke and mouse patterns is about 5, and the number of clickstream patterns is about 10.

Given a soft match from each of the tracking algorithms, a complete set of associations can then be enumerated at step 82 and scored at step 84. Enumeration creates all the possible combinations. For each combination, a score is computed, which can be the product of the similarities of the members of the combination. It is not required that the score be the product of all the similarities; the score can also be based on various other possible combinations.

Then at step 86, an on-the-fly unique user identification can be made. The individual matching algorithms generate on-the-fly soft matches to current input data, which is then be used by the fusion algorithm to perform a hard match to its existing set of unique users to identify the current user.

Once the current user is identified, it is possible to effectively deliver to the user targeted content such as, e.g., targeted advertising or program viewing recommendations.

The fusion algorithm can then update the frequencies of recurrence for the enumerated combinations. One possible way of doing this would be by adding the current score of each particular combination to its previous cumulative score at step 88. It is preferable to decay all existing scores prior to applying the updates, so that infrequent or inactive patterns are weighted less heavily.

Unique users can be associated with patterns whose scores stand out significantly from the rest. After every update of combination scores, the fusion algorithm can determine at step 90 if any additions or deletions from the current set of inferred unique users is indicated. A new user can be added if the score of some combination exceeds a given threshold. An existing user can be deleted if the score of the corresponding combination falls below a given threshold. These thresholds are relative to the magnitudes of the entire set of scores, and represent degrees of "standing out" among all the combinations.

Before an addition occurs (entailing the creation of a new profile), it is preferably determined whether or not the presumed new user in fact corresponds to an existing user. Since there is the possibility that an individual user could manifest more than one type of clickstream behavior, a new user having the same keystroke and mouse behavior of an existing user can be associated with the existing user, since keystroke and mouse behaviors are more likely to correlate strongly with individual users compared to clickstream behavior.

If an addition and a deletion occur at about the same time, it is possible that a particular user has simply "drifted", in which case that profile should be reassigned rather than being deleted and a new personal profile created.

While the embodiments described above generally relate to identifying or tracking individual users of client terminals, they can be applied as well to identifying recurring groups of such users. For example, television viewing at various times is performed by groups of individuals such as, e.g., by a husband and wife or by a group of children. These combinations of individuals could manifest distinct behavior.

For cases in which the system is unable to identify a user (or group of users) with a sufficient degree of certainty, the user could be designated as 'unknown' and an average user profile for the terminal device could be assumed.

Having described preferred embodiments of the present invention, it should be apparent that modifications can be made without departing from the spirit and scope of the invention.

The invention claimed is:

1. A method, comprising:
providing a database containing a plurality of user input pattern profiles of prior user inputs to a terminal device, each of a group of possible users of said terminal device being associated with at least one of said user input pattern profiles;
detecting at least one current input pattern from use of said terminal device, said current input pattern including user mouse usage data;
dynamically matching said at least one current input pattern with one of said user input pattern profiles; and
identifying a current user of said terminal device from said group of possible users by selecting the possible user associated with the one of said user input pattern profiles as the current user.

2. The method of claim 1 wherein said at least one current input pattern comprises a plurality of different input patterns, and wherein dynamically matching said at least one current input pattern comprises combining said plurality of different patterns and matching a combination of said different input patterns with one of said user input pattern profiles.

3. The method of claim 1 further comprising retraining said plurality of user input pattern profiles in said database with said at least one current input pattern.

4. The method of claim 1 further comprising determining a personal user profile associated with the current user.

5. The method of claim 4 further comprising transmitting targeted content to said current user in accordance with said personal user profile.

6. The method of claim 1 wherein said current input pattern comprises user clickstream data.

7. The method of claim 6 wherein said clickstream data relates to particular Web sites visited by the user or the duration of visits to the Web sites.

8. The method of claim 1 wherein said current input pattern comprises user keystroke data.

9. The method of claim 8 wherein said keystroke data comprises digraph interval data.

10. The method of claim 1 wherein said current input pattern comprises user remote control usage data.

11. The method of claim 1 wherein said terminal device comprises one of a computer and a television set top box.

12. The method of claim 1 wherein said steps are implemented in a computer, and said computer communicates with said terminal device over a network comprising at least one of the Internet and a nodal television distribution network.

13. A system, comprising:
   a database containing a plurality of user input pattern profiles of prior user inputs to a terminal device, each of a group of possible users of said terminal device being associated with at least one of said user input pattern profiles;
   means for detecting at least one current input pattern from use of said terminal device, said current input pattern including user mouse usage data;
   means for dynamically matching said at least one current input pattern with one of said user input pattern profiles; and
   identifying a current user of said terminal device from said group of possible users by selecting the possible user associated with the one of said user input pattern profiles as the current user.

14. The system of claim 13 further comprising means for transmitting targeted content to said current user in accordance with said personal user profile.

15. The system of claim 13 wherein said current input pattern comprises user clickstream data relating to particular Web sites visited by the user or the duration of visits to the Web sites.

16. A computer system, comprising:
   memory for storing a program and a plurality of user input pattern profiles of prior user inputs to a terminal device, each of a group of possible users of said terminal device being associated with at least one of said user input pattern profiles; and
   a processor operative with the program to:
   (a) detect at least one current input pattern from use of said terminal device, said current input pattern including user mouse usage data;
   (b) dynamically match said at least one current input pattern with one of said user input pattern profiles; and
   (c) identifying a current user of said terminal device from said group of possible users by selecting the possible user associated with the one of said user input pattern profiles as the current user.

17. The system of claim 16 wherein said current input pattern comprises user keystroke data including digraph interval data.

18. A method, comprising:
   providing a database containing a plurality of user input pattern profiles of prior user inputs to a terminal device, each of a plurality of possible users of said terminal device being associated with at least one of said user input pattern profiles;
   detecting at least one current input pattern from use of said terminal device, said current input pattern including user mouse usage data;
   dynamically matching said at least one current input pattern with one of said user input pattern profiles;
   identifying a current user of said terminal device from said possible users by selecting the possible user associated with the one of said user input pattern profiles as the current user;
   determining a personal user profile associated with the current user; and
   transmitting targeted content to said current user in accordance with said personal user profile.

19. The method of claim 18 wherein said targeted content comprises at least one of targeted advertising and recommended program viewing choices.

20. The method of claim 18 wherein said personal profile includes demographic or preference data on said current user.

21. The method of claim 18 wherein said steps are implemented in at least one of a computer server, a video server and a Web server.

22. The method of claim 18 wherein said terminal device comprises at least one of a set top box and a computer.

23. A method, comprising:
   detecting a plurality of different types of current input patterns from use of a terminal device by a current user;
   performing a soft match of each of said plurality of different types of current input patterns with a plurality of stored input patterns for each of said types of input patterns, said current input pattern including user mouse usage data, said stored patterns representing input patterns for a group of possible users of said terminal device, said soft matches generating scored possible matches for each of said different types of data;
   determining possible combinations of said scored possible matches;
   determining a score for each said combination; and
   identifying said current user of said terminal device from said group of possible users by selecting a possible user associated with said combination as the current user for the combination having the highest score.

24. A system, comprising:
   means for detecting a plurality of different types of current input patterns from use of a terminal device by a current user;
   means for performing a soft match of each of said plurality of different types of current input patterns with a plurality of stored input patterns for each of said types of input patterns, said current input patterns including user mouse usage data, said stored patterns representing input patterns for a group of possible users of said terminal device, said soft matches generating scored possible matches for each of said different types of data;
   means for determining possible combinations of said scored possible matches;
   means for determining a score for each said combination; and
   means for identifying said current user of said terminal device from said group of possible users by selecting a possible user associated with combination having the highest score as the current user.

25. A method, comprising:

detecting a plurality of different types of current input patterns from use of a terminal device by a current subset of users;

performing a soft match of each of said plurality of different types of current input patterns with a plurality of stored input patterns for each of said types of input patterns, said current input patterns including user mouse usage data, said stored patterns representing input patterns for various subsets of a set of possible users of said terminal device, said soft matches generating scored possible matches for each of said different types of data;

determining possible combinations of said scored possible matches;

determining a score for each said combination; and identifying said current subset of users of said terminal device from said set of possible users by selecting a subset of users associated with said combination as the current subset of users for the combination having score indicating a substantial match.

* * * * *